(12) United States Patent
Calhoun et al.

(10) Patent No.: US 7,032,616 B1
(45) Date of Patent: Apr. 25, 2006

(54) GAS AND LIQUID STORAGE TANK DOME SHELL PROTECTIVE COVER

(76) Inventors: Darrel R. Calhoun, 375 Jones Rd., Springville, AL (US) 35146; Robert G. Holcombe, 16 Co. Road 434, P.O. Box 171, Fyffe, AL (US) 35971

( * ) Notice: Subject to any disclaimer, the term of this patent is extended or adjusted under 35 U.S.C. 154(b) by 0 days.

(21) Appl. No.: 11/075,699

(22) Filed: Mar. 10, 2005

(51) Int. Cl.
*F16K 35/00* (2006.01)

(52) U.S. Cl. .................. 137/382; 137/377; 137/381

(58) Field of Classification Search ............ 137/377, 137/381, 382
See application file for complete search history.

(56) References Cited

U.S. PATENT DOCUMENTS

| | | | | |
|---|---|---|---|---|
| 1,894,867 A | * | 1/1933 | Hoffman | 141/392 |
| 1,898,378 A | | 2/1933 | McIntyre | |
| 2,418,853 A | | 4/1947 | Ewing | |
| 2,653,747 A | * | 9/1953 | Maida | 141/392 |
| 2,737,972 A | * | 3/1956 | Callery et al. | 137/377 |
| 4,301,828 A | | 11/1981 | Martin, Jr. | |
| 4,453,562 A | * | 6/1984 | Palkovics | 137/382 |
| 6,749,080 B1 | | 6/2001 | White | |
| 6,530,576 B1 | | 3/2003 | Earl et al. | |
| 6,536,462 B1 | * | 3/2003 | Laugen | 137/296 |
| 6,568,421 B1 | * | 5/2003 | Anderson | 137/382 |
| 6,701,982 B1 | * | 3/2004 | Ortiz et al. | 141/392 |

* cited by examiner

*Primary Examiner*—A. Michael Chambers
(74) *Attorney, Agent, or Firm*—Shlesinger, Arkwright & Garvey LLP.

(57) ABSTRACT

A gas and liquid storage tank dome shell protective cover for engaging the edge of a U-shaped opening in a dome shell to seal the opening and the storage tank service line extending through the opening to prevent creatures big and small from entering into the dome shell to build nests which shield includes a service line engaging opening having a 360° series of radio slits forming a circular series of pointed flaps which fits snuggly against the service line to provide a circular seal for the service line.

13 Claims, 2 Drawing Sheets

GAS AND LIQUID STORAGE TANK DOME SHELL PROTECTIVE COVER

FIELD OF THE INVENION

This invention relates to a device for preventing access to a dome shell of gas and liquid storage tanks by animals and birds and in particular insects.

BACKGROUND OF THE INVENTION

Liquid and gas tanks such as propane, oxygen, hydrogen and nitrogen have valves and regulators that are typically equipped with covers to protect these items from the elements. The covers include an exit for a service line extending from the valves and regulators to the house or business or the like being served. The dome shell opening creates a problem in that birds and mice and other small animals tend to get into the dome and build their nest. Other small creatures such as wasps and spiders also find the dome shell a harbor to build their nests and webs. The birds nest foul the area around the valves and regulators making the components difficult to service when a tank is being replaced by the distributor personnel but in particular the wasps and spiders and especially the stinging and the poisonous kind attack the distributor personnel when they are serving the storage tank. Many of the service personnel have been severely stung by wasps and spiders and some cases causing hospitalization.

McIntyre U.S. Pat. No. 1,898,378 is an early patent providing a cover for the dome of a fuel tank which engages around the service line. The device of McIntyre cannot be slipped off of the service line without removing the service line from the fuel tank.

Ewing U.S. Pat. No. 2,418,253 provides a sealed service line, but the dome must be removed in order to obtain access to the regulator and dials.

Martin, Jr. U.S. Pat. No. 4,301,828 provides a protective cover for the service line, but it can only be removed from the service line by withdrawing the service line.

Earl et al. U.S. Pat. No. 6,530,576 and White U.S. Pat. No. 6,749,080 provide protective covers which can be slid onto the service line without removing the service line. These references prevent the ingress of small animals but do not prevent the ingress of spiders, or bees or the like into the dome shell, since there are gaps around the pipe through which bees, or spiders or the like can enter and build their nests or webs.

OBJECTS AND SUMMARY OF THE INVENTION

It is an object of this invention to provide a dome shell protective cover which engages the edge of the opening in the dome and can be readily slipped over a service line extending into the dome, and which prevents creatures big and small from entering into the dome to build their nests or webs.

Another object of this invention is to provide a protective cover which is easily and inexpensively manufactured.

A further object of this invention is to provide a dome shell protective cover which when positioned provides a 360° seal around the service line thereby preventing access to the inside of the dome shell by large and small creatures.

A still further object of this invention is to provide a protective cover which can be readily packaged and carried by the service distributor for replacement if the existing cover has been damaged.

Yet another object of this invention is to provide a protective cover which is flexible and easily manipulated by the distributor service personnel.

In summary this invention relates to a dome shell protective cover which slips into a U-shaped opening in the dome shell and which provides a protective shield around the service line to prevent ingress of varmints as will be apparent from the following description and drawings which are as hereby defined.

BRIEF DESCRIPION OF THE DRAWINGS

DETAILED DESCRIPTION OF THE INVENTION

FIGS. 1–6

Figure 1:
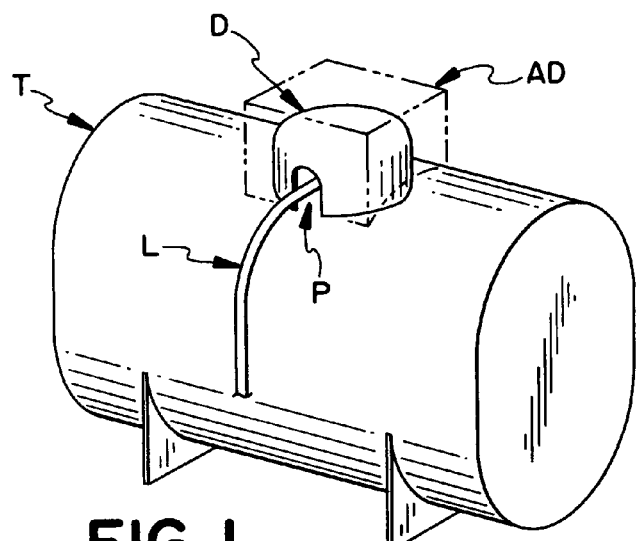
FIG. 1 is a perspective view of the storage tank and dome with a portion of the service line extending from the dome and also showing in phantom lines are alternative rectangular dome construction.

FIG. 1 illustrates a typical storage tank T having a rounded dome shell D shown in solid lines and an alternative box-type dome AD shown in phantom lines. A service line L extends from the dome opening P. Typically regulators and valves would be under the dome D or the dome AD.

Figure 2:
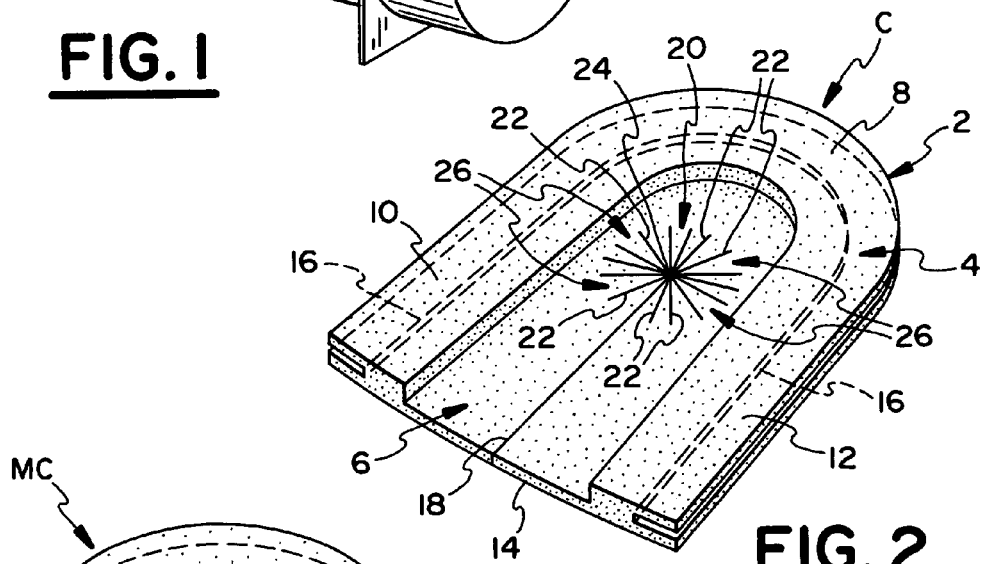
FIG. 2 is a perspective showing a protective cover for the dome shell with portions of the slot shown in phantom lines.
Figure 6:
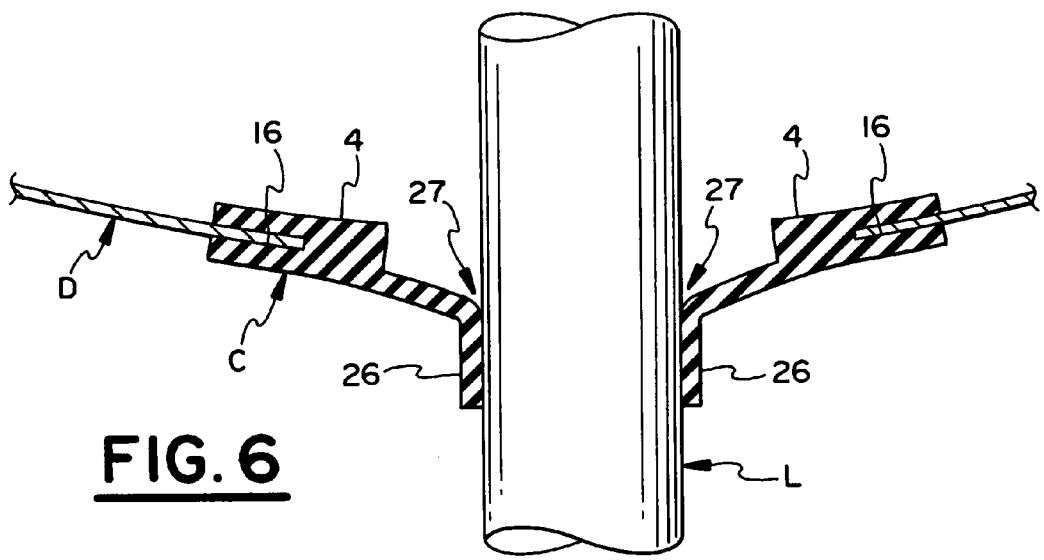
FIG. 6 is a fragmentary elevational view with the protective cover shown mounted on the flange of the dome shell and in sealing relation to the service line.

As shown in FIG. 2, a protective cover C comprises a shield 2, which is of resilient and flexible rubber-like material including plastic which is durable under all types of weather conditions and will not readily deteriorate due to sunlight, ultraviolet light, and freezing conditions. The shield 2 has a U-shaped peripheral edge member 4 and a base peripheral edge member 6. The U-shaped peripheral edge member 4 includes a curved portion 8 and a pair of flared legs 10 and 12. The base peripheral member 6 comprises a slight arcuate edge 14 for conforming to the tank T surface when used with the circular dome shell D. The U-shaped peripheral edge member 4 includes a slot 16 which engages the side edges of the tank opening P to form a seal about the edges of the opening P. The slot 16 has a width corresponding to the thickness of the edge of the U-shaped opening P. The depth of slot 16 should be greater than about ½ inch to prevent accidental dislodgement. Extending upwardly from the center of the arcuate edge 14 is a slit 18 extending to the service line engaging opening 20. The service line engaging opening 20 has a 360° series of radial slits 22 extending outwardly from the central point 24 of the service line engaging opening 20. The radial slits 22 extend a distance outwardly from the central point 24 equal to the radius of the service line L which will be installed therein. The radial slit 22 forms a circular series of pointed flaps 26. As best shown in FIG. 6, the circular series of pointed flaps 26 each have a base 27 which fits snuggly against the service line L. The number of radial slits 22 may be from 18 to 36 with a preferred number of about 12 to 20 and 16 being standard.

When installing the protective cover C, the service line L is engaged in the bottom of the slit 18 and moved downwardly until the service line L is centered in the service line engaging opening 20. The shield 2, being flexible, is then positioned in the edge of the domed shell opening P so that the slot 16 engages the edge of the opening P of the dome shell D. The arcuate edge 14 engages the surface of the tank T to give an all around seal.

Figure 3:
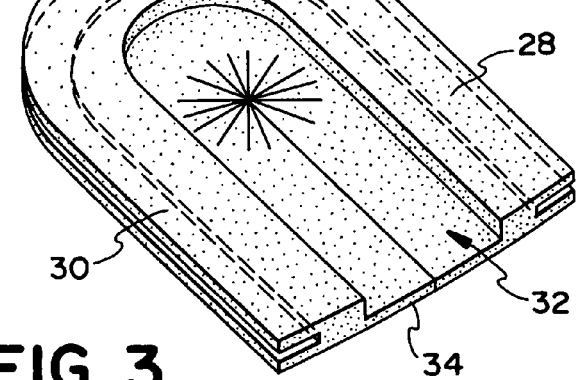
FIG. 3 is a perspective showing a modified version of a protective cover with portions of the slot shown in phantom lines.

The protective cover MC in FIG. 3 differs only from that of FIG. 2 in that the legs 28 and 30 are not flared as are the legs 10 and 12 in FIG. 2. In addition, the base peripheral edge member 32 has a substantially straight edge 34.

Figure 4:
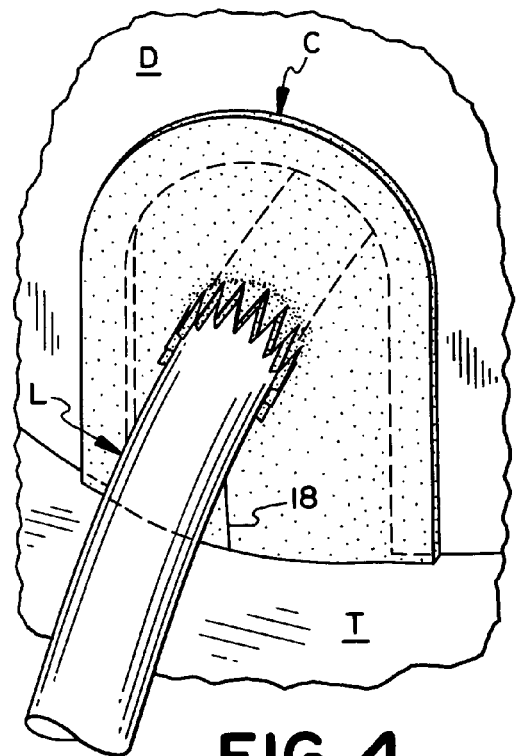
FIG. 4 is a fragmentary elevational view showing the protective cover installed in the dome and engaging the service line with portions shown in phantom lines.
Figure 5:
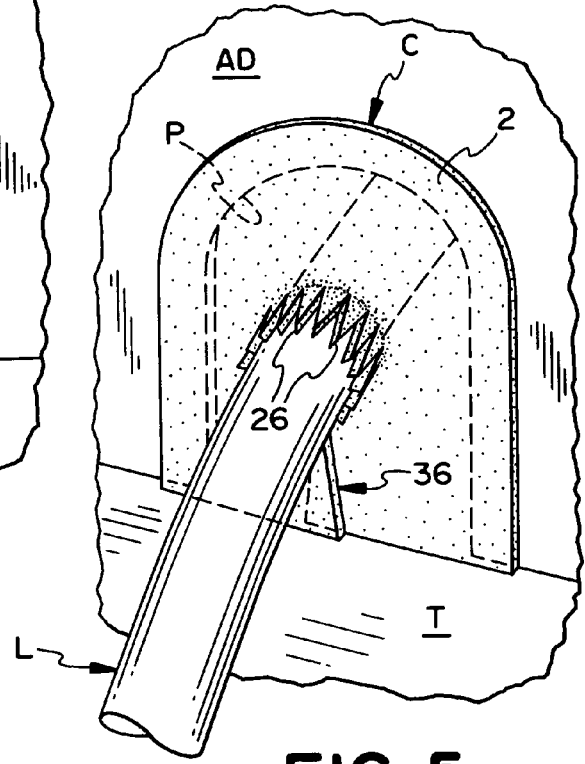
FIG. 5 is a fragmentary view of a modified version of the protective cover installed in the dome shell with portions shown in phantom lines.

It should be noted that the protective cover MC shown in FIG. 3 would be used in the alternative dome shell AD where the front wall would be straight rather than curved as will be the dome shell D shown in solid lines in FIG. 1. If the protective cover C shown in FIG. 2 were used in a dome of the type AD shown in phantom lines in FIG. 1, a slight abutting overlap would occur as best shown in FIG. 5. FIG. 4 shows a typical installation of the protective cover C in a dome shell D. In this instance, the slit 18 edges abut as illustrated.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. A dome shell protective cover for engaging the edge of a U-shaped opening in said dome shell and securing said U-shaped opening and the storage tank service line extending through said U-shaped opening to prevent creatures big and small from entering into said shell dome and building nests comprising:
    a) a shield;
    b) said shield being of resilient rubber-like material;
    c) said shield having a U-shaped peripheral edge member including a curved portion and a pair of legs connected to said curved portion and a base peripheral edge member;
    d) said U-shaped peripheral edge member having a slot for receiving the edge of said U-shaped opening;
    e) said slot having a width corresponding to the thickness of said edge of said U-shaped opening;
    f) said shield having a service line engaging opening;
    g) said shield having a slit extending upwardly from said base peripheral edge to said service line engaging opening;
    h) said service line engaging opening having a central point and having a 360° series of radial slits each extending outwardly from said central point a distance equal to the radius of said service line and forming a circular series similar pointed flaps;
    i) said pointed flaps being flexible and each having a base which fits snuggly against said service line whereby said pointed flaps at their base provide a circular seal for said service line from creatures big and small after said service line has been positioned first in said slot extending upwardly from said base peripheral edge and thence into said service line engaging opening; and
    j) said upwardly extending slit having abutting edge portions which form a seal when said service line has been positioned in said service line engaging opening.

2. A dome shaped protective cover as in claim 1, and wherein:
    a) said resilient rubber-like material is plastic.

3. A dome shaped protective cover as in claim 1, and wherein:
    a) said shield peripheral edge pair of legs are parallel.

4. A dome shaped protective cover as in claim 1, and wherein:
    a) said shield peripheral edge pair of legs are flared.

5. A dome shaped protective cover as in claim 4, and wherein:
    a) said upwardly extending slit has contacting overlapping edge portions when said shield has been positioned in said U-shaped opening and said service line has been positioned in said service line opening.

6. A dome shaped protective cover as in claim 1, and wherein:
    a) said base peripheral edge is arcuate.

7. A dome shaped protective cover as in claim 1, and wherein:
    a) said radial slits are from 8 to 36 in number.

8. A dome shaped protective cover as in claim 1, and wherein:
    a) said radial slits are about 12 to about 20 in number.

9. A dome shaped protective cover as in claim 1, and wherein:
    a) said radial slits are 16.

10. A dome shaped protective cover as in claim 1, and wherein:
    a) said service line engaging opening lies centrally of said U-shaped peripheral edge.

11. A dome shaped protective cover as in claim 1, and wherein:
    a) said circular series of pointed flaps are similar.

12. A dome shaped protective cover as in claim 1, and wherein:
    a) said base peripheral edge is substantially flat.

13. A dome shaped protective cover as in claim 1, and wherein:
    a) said slot has a depth greater than about ½ inch.

* * * * *